(12) United States Patent
Nakamura et al.

(10) Patent No.: US 11,052,738 B2
(45) Date of Patent: Jul. 6, 2021

(54) DEFLECTOR STRUCTURE FOR SUNROOF DEVICE

(71) Applicant: YACHIYO INDUSTRY CO., LTD., Saitama (JP)

(72) Inventors: Teruyuki Nakamura, Tochigi (JP); Yoshiyuki Ishii, Tochigi (JP)

(73) Assignee: YACHIYO INDUSTRY CO., LTD., Saitama (JP)

( * ) Notice: Subject to any disclaimer, the term of this patent is extended or adjusted under 35 U.S.C. 154(b) by 99 days.

(21) Appl. No.: 16/464,611

(22) PCT Filed: Nov. 1, 2017

(86) PCT No.: PCT/JP2017/039525
§ 371 (c)(1),
(2) Date: May 28, 2019

(87) PCT Pub. No.: WO2018/096888
PCT Pub. Date: May 31, 2018

(65) Prior Publication Data
US 2020/0376945 A1     Dec. 3, 2020

(30) Foreign Application Priority Data
Nov. 25, 2016   (JP) ............................ JP2016-228538

(51) Int. Cl.
B60J 7/22        (2006.01)
(52) U.S. Cl.
CPC ...................................... B60J 7/22 (2013.01)
(58) Field of Classification Search
CPC .................................... B60J 7/22; B60J 7/223
(Continued)

(56) References Cited

U.S. PATENT DOCUMENTS 9,227,489 B2 *   1/2016  Farber ................... B60J 7/0046
2007/0236052 A1  10/2007 Biewer et al.
2013/0187414 A1   7/2013 Nowack et al.

FOREIGN PATENT DOCUMENTS

DE      10 2004 043 620 A1    3/2006
EP         0 196 684 A1      10/1986
(Continued)

OTHER PUBLICATIONS

Chinese Office Action for the related Chinese Patent Application No. 201780072659.X dated Nov. 13, 2019.
(Continued)

*Primary Examiner* — Dennis H Pedder
(74) *Attorney, Agent, or Firm* — Kenealy Vaidya LLP (57) ABSTRACT

Provided is a deflector structure for a sunroof device to inhibit an arm portion from being pivoted when a vehicle traveling, with a simple structure. The deflector structure includes: a fixed part fixed to a side frame; an affected part arranged anterior to the fixed part and affected by onrushing air; an arm portion having one end pivotally connected to the fixed part and the other end holding the affected part, and vertically pivoted about the fixed part; and a lock member having one end pivotally connected to the arm portion and the other end pivoted in conjunction with the arm portion being pivoted, wherein the lock member is configured such that a lock main body of the lock member is in contact with the fixed part and raised, at a predetermined pivot position, to lock the arm portion being pivoted downward.

4 Claims, 7 Drawing Sheets

(58) Field of Classification Search
USPC .......................................................... 296/217
See application file for complete search history.

(56) References Cited

FOREIGN PATENT DOCUMENTS

| | | | |
|---|---|---|---|
| EP | 1844969 A1 | | 10/2007 |
| EP | 2 868 504 A1 | | 5/2015 |
| GB | 2 168 937 A | | 7/1986 |
| JP | S59-14710 U | | 1/1984 |
| JP | 2005-289087 | * | 10/2005 |
| JP | 2016-60480 A | | 4/2016 |
| NL | 7510515 A | | 3/1977 |
| WO | 2018/096888 A1 | | 5/2018 |

OTHER PUBLICATIONS

International Search Report and Written Opinion of the International Search Report for PCT/JP2017/039525 dated Dec. 5, 2017.
The extended European Search Report for the related European Patent Application No. 17874685.5 dated Jun. 9, 2020.

* cited by examiner

DEFLECTOR STRUCTURE FOR SUNROOF DEVICE

CROSS-REFERENCE TO RELATED APPLICATION

This application is a U.S. National Stage Application under 35 U.S.C § 371 of International Patent Application No. PCT/JP2017/039525 filed on 1 Nov. 2017, which claims the benefit of priority to Japanese Patent Application No. 2016-228538 filed on 25 Nov. 2016, the disclosures of all of which are hereby incorporated by reference in their entireties.

TECHNICAL FIELD

The present invention relates to a deflector structure for a sunroof device.

BACKGROUND ART

A deflector structure for a sunroof device is widely known to include a net deflector (hereinafter referred to as an "affected part") that is stretched out when in use to receive onrushing air, and is folded back and stored under the roof when not in use. Japanese Patent Application Publication No. 2016-60480, for example, discloses a deflector structure including an arm portion that holds an upper end portion of an affected part and is vertically pivoted, and a spring that biases the arm portion upward, wherein the arm portion is biased upward by the spring when in use to stretch out the affected part.

Incidentally, if the affected part in a stretched out state receives strong onrushing air, when the vehicle traveling at a high speed or the like, there is a risk of the affected part being pushed backward by wind force to pull down the arm portion against the biasing force of the spring. In addition, when the vehicle travels at a high speed to follow a leading vehicle, there is a risk of the onrushing air having different onrushing levels due to turbulence caused by the leading vehicle, to cause the arm portion to be flapped up and down against the biasing force of the spring.

The deflector structure of Japanese Patent Application Publication No. 2016-60480 is therefore provided with a locking lever for locking deformation of the spring when the affected part is stretched out, to inhibit the arm portion from being pivoted.

SUMMARY OF THE INVENTION

Problems to be Solved

However, the related art described above has a structure to lock the spring by the locking lever for indirectly locking the arm portion being pivoted via the spring, to have problems of making the structure complicated and decreasing assembly productivity.

The present invention has been made in view of such problems, and is intended to provide a deflector structure for a sunroof device that inhibits an arm portion from being pivoted, when the vehicle traveling, with a simple structure.

Solution to Problems

In order to solve such problems, the present invention provides a deflector structure for a sunroof device, including: a fixed part that is fixed to a vehicle body; an affected part that is arranged anterior to the fixed part and is affected by onrushing air; an arm portion that has one end pivotally connected to the fixed part and the other end holding the affected part, and is vertically pivoted about the fixed part; and a lock member that has one end pivotally connected to the arm portion and the other end pivoted in conjunction with the arm portion being pivoted, wherein the other end of the lock member is in contact with the fixed part and raised, at a predetermined pivot position, to lock the arm portion being pivoted toward a direction to approach the fixed part.

According to the present invention, the lock member directly locks the arm portion being pivoted, to allow for inhibiting the arm portion from being pivoted, when the vehicle traveling, with a simple structure.

In addition, the lock member preferably has an unlocking portion that, when a pressing load is applied thereto in a locking state, unlocks the locking state.

This allows for easily unlocking the locking state with a simple configuration.

Further, the deflector structure preferably further includes a guide member that has one end connected to the arm portion and the other end connected to the lock member, and guides the lock member so as to be pivoted to a position where the lock member is in contact with the fixed part and raised.

This allows the guide member to guide the lock member accurately and quickly to the position for the locking.

Furthermore, it is preferable in the present invention that the lock member has a curved surface on the other end to have a convex downward shape in a raised state, while the fixed part is formed to include a contact surface having a curved surface in a concave downward shape.

This allows the lock member to fulfill the locking function even when the predetermined pivot position varies, at the time of the lock member being raised, due to the tolerance of the affected part, the arm portion, the lock member, and the like, to inhibit the arm portion more reliably from being pivoted when the vehicle traveling.

Advantageous Effects of the Invention

The deflector structure for the sunroof device according to the present invention inhibits the arm portion from being pivoted, when the vehicle traveling, with a simple structure.

DETAILED DESCRIPTION OF EMBODIMENTS

Figure 1:
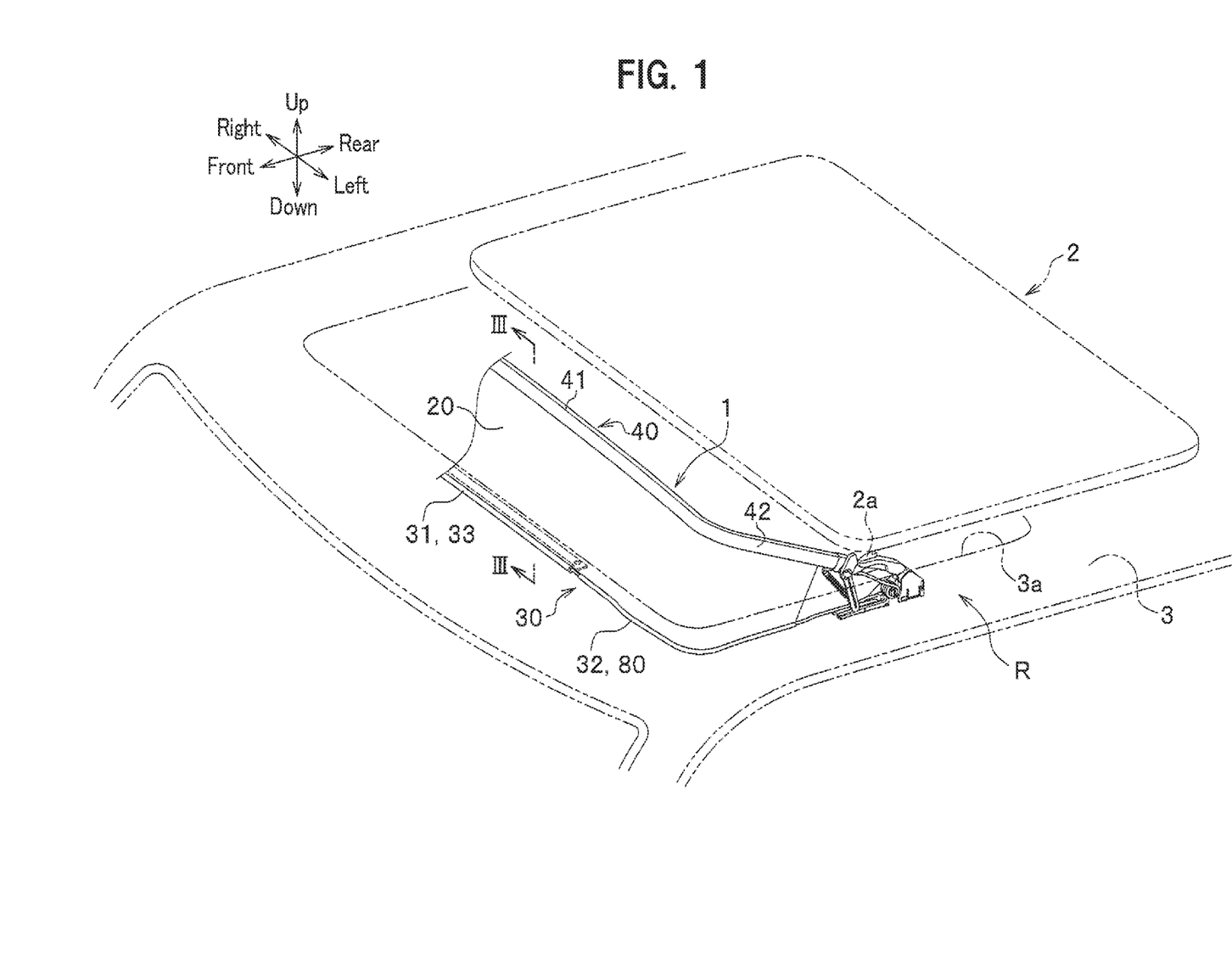
FIG. 1 is a partially broken perspective view of a deflector for a sunroof device according to the present embodiment.

Embodiments of the present invention will be described in detail with reference to drawings. In the description, the same elements will be denoted by the same reference numerals and duplicate descriptions will be omitted. Directions of up and down, right and left, and front and rear in the description are based on up and down, right and left, and front and rear as viewed from the driver's seat, and a vehicle width direction is equal to a right-left direction. In FIG. 1, for the purpose of illustration, a deflector 1 is shown by solid lines and broken lines, while components other than the deflector 1 are shown by two-dot chain lines.

As shown in FIG. 1, a sunroof device R includes a roof panel 2 for covering and uncovering an opening 3a in a substantially rectangular shape formed in a fixed roof 3 of a vehicle body, and a deflector 1 projecting upward from the fixed roof 3 along a front edge of the opening 3a when the roof panel 2 slides rearward to uncover the opening 3a.

Provided on a lower surface of the roof panel 2 is a pressing shoe 2a that pushes down the deflector 1 when the roof panel 2 slides forward. Arranged under both side edges of the opening 3a are side frames (not shown), each having a function of guiding the roof panel 2 to slide and a function of supporting the deflector 1. Arranged under the front edge of the opening 3a is a front frame (not shown) connecting the front ends of both of the side frames therewith.

Figure 2:
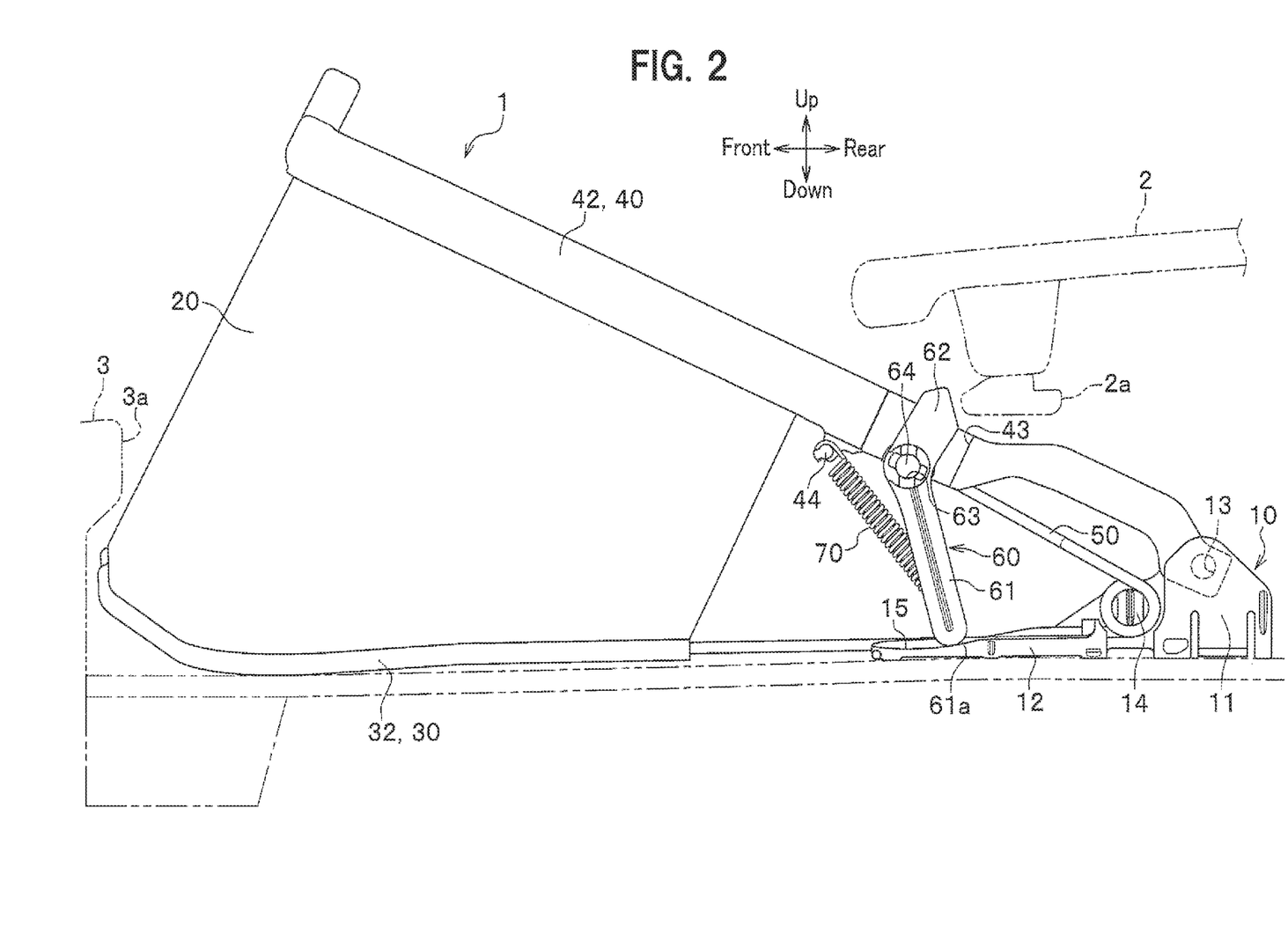
FIG. 2 is a side view of the deflector in a stretched state.

As shown in FIG. 2, the deflector 1 includes: a fixed part 10 that is fixed to a side frame of a vehicle body; an affected part 20 that is arranged anterior to the fixed part 10 and affected by onrushing air; a lower holder 30 that holds a lower end of the affected part 20, and an upper holder 40 that holds the upper end of the affected part 20 and is vertically pivotable. In addition, the deflector 1 includes: a biasing member 50 for biasing the upper holder 40 upward; a lock member 60 for locking at a predetermined pivot position the upper holder 40 being pivoted downward; and a guide member 70 for guiding the lock member 60 to the predetermined pivot position.

The fixed part 10 extends in the front-rear direction along the side edge of the opening 3a. The fixed part 10 includes a base part 11 and a support part 12. The base part 11 is provided with a pivot support pin 13 along the vehicle width direction for supporting the upper holder 40 being pivoted. The base part 11 is provided with a mounting support pin 14 along the vehicle width direction and anterior to the pivot support pin 13 for mounting the biasing member 50. The support part 12 is formed continuously to the front end of the base part 11. The support part 12 is a part in a plate shape to support the lock member 60. A contact surface 15 is formed on an upper surface of the support portion 12 at its front end so as to be in contact with the other end 61a of the lock member 60. The contact surface 15 has a curved surface in a concave downward shape.

Figure 3:
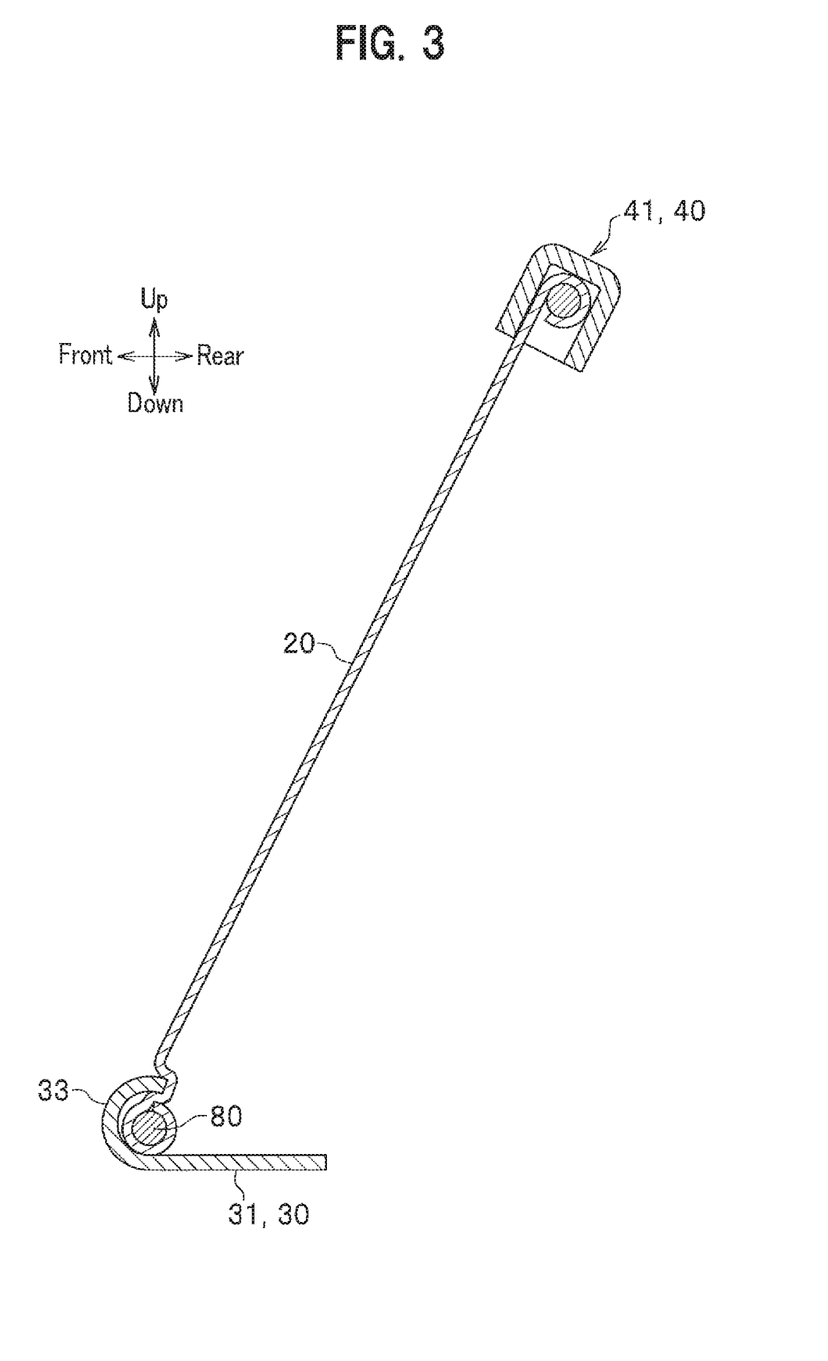
FIG. 3 is a cross-sectional view taken along a line III-III in FIG. 1.

The affected part 20 is a part that is stretched out when in use to receive onrushing air, and is folded back and stored under the roof when not in use. The affected part 20 extends from the front edge of the opening 3a to the front side of the side edge. The affected part 20 is composed of a mesh-like member made of fine cloth or resin, for example. As shown in FIG. 3, the affected part 20 has its lower edge formed to have a roll shape in side cross section. The roll portion has a metal wire 80 inserted therein. The wire 80 continuously extends from the front edge of the opening 3a via the front side of the side edge to the fixed part 10. The wire 80 inserted into the roll portion is inserted and held in a groove portion of the lower holder 30.

As shown in FIG. 1, the lower holder 30 has a central fixing portion 31 extending in the vehicle width direction along the front edge of the opening 3a, and a cover portion 32 extending outward in the vehicle width direction from both ends of the central fixing portion 31 and being orthogonally bent to further extend rearward. The central fixing portion 31 is composed of a plate-like member made of metal or resin, for example. The central fixing portion 31 is fixed to the front frame by a fastening member or the like. The central fixing portion 31 is formed at its front edge with a groove portion 33 in a U-shape opening rearward (see FIG. 3). The cover portion 32 covers the wire 80 inserted into the roll portion. The cover portion 32 is formed of a flexible resin material, for example.

The upper holder 40 has a central holder portion 41 extending in the vehicle width direction along the front edge of the opening 3a, and arm portions 42 being orthogonally bent from both ends of the central holder portion 41 and extending rearward. Both ends of the affected part 20 are mounted between the upper holder 40 and the lower holder 30 so as to come around halfway of the arm portion 42. The upper holder 40 is formed of a resin material, for example. The front end of the arm portion 42 holds the upper end of the affected part 20, as shown in FIG. 2. The rear end of the arm portion 42 is vertically pivotally connected to the fixed part 10 via the pivot support pin 13. The arm portion 42 is formed on its rear end with a stopper portion 43. In the present embodiment, the stopper portion 43 is composed of a step formed by a part of the arm portion 42 being bulged outward in the vehicle width direction. The stopper portion 43 is a portion that is in contact with an unlocking portion 62 to be described later when the lock member 60 is pivoted, to inhibit the lock member 60 from being pivoted. The arm portion 42 is formed on its lower surface with an engaging portion 44 protruding downward.

The biasing member 50 is a member for biasing the arm portion 42 upward as shown in FIG. 2, and is composed of a torsion coil spring, for example. The biasing member 50 is attached to the mounting support pin 14 of the fixed portion 10 at a position anterior to the pivot support pin 13. One end of the biasing member 50 is in contact with a lower surface of the arm portion 42, while the other end is in contact with an upper surface of the support portion 12.

The lock member 60 is a member for inhibiting the arm portion 42 at a predetermined pivot position from being pivoted downward. As shown in FIG. 2, the lock member 60 is composed of a plate-like material made of resin, for example. The lock member 60 is arranged at a position anterior to the biasing member 50. One end of the lock member 60 is attached to a lock pivot shaft 64 formed in the arm portion 42 so as to be pivoted in the front-rear direction. The lock member 60 pivots about the lock pivot shaft 64 in conjunction with the arm portion 42 being pivoted. The lock member 60 mainly includes a lock main body 61, the unlocking portion 62, and a through-hole 63.

Figure 4:
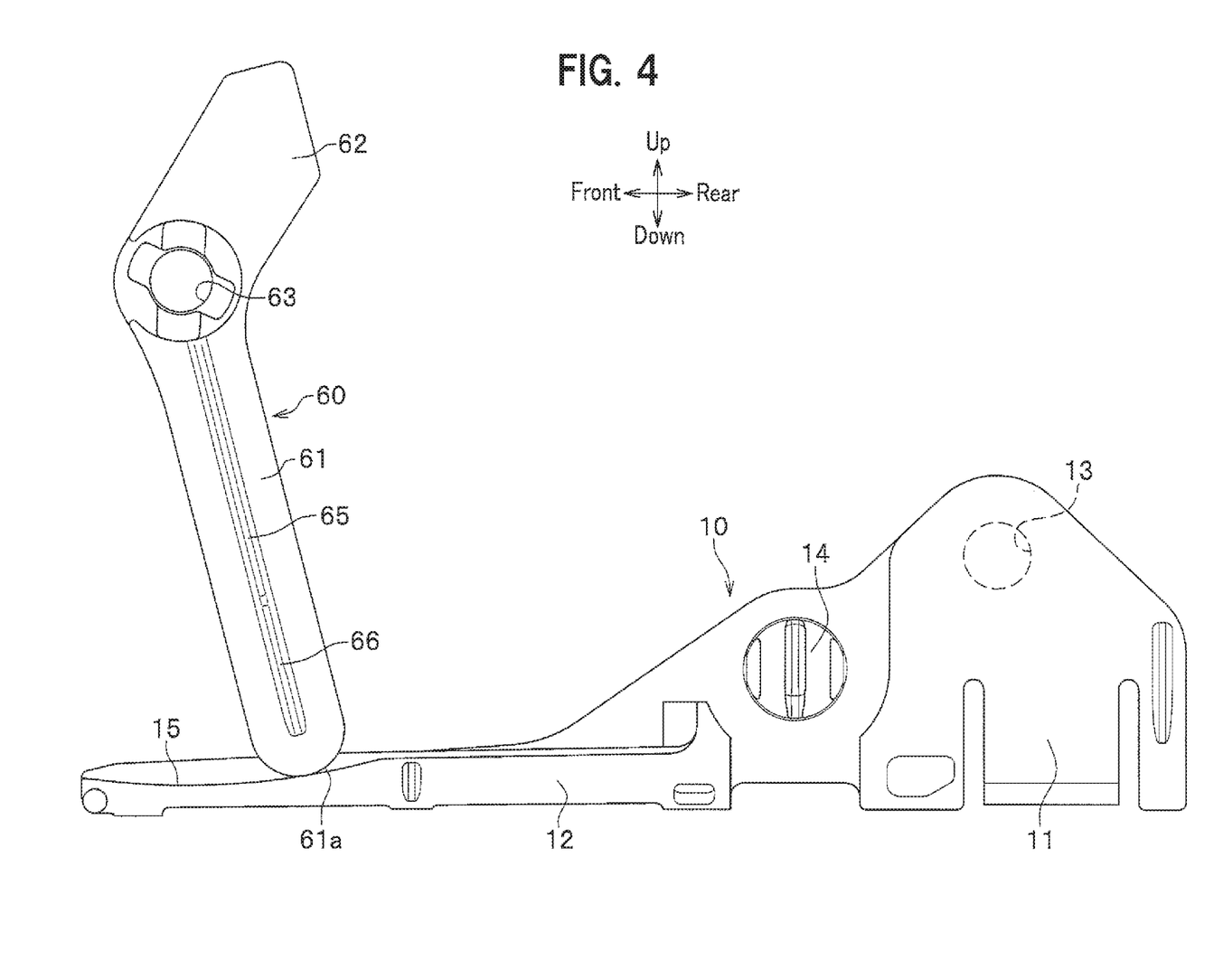
FIG. 4 is a side view of a fixed part and a lock member.

When the roof panel 2 slides rearward to uncover the opening 3a, the lock main body 61 is in contact with the fixed part 10 and raised substantially vertically between the fixed part 10 and the arm portion 42, to lock the arm portion 42 being pivoted downward. As shown in FIG. 4, the lock main body 61 has a curved surface on the other end 61a to have a convex downward shape in the raised state.

Figure 5:
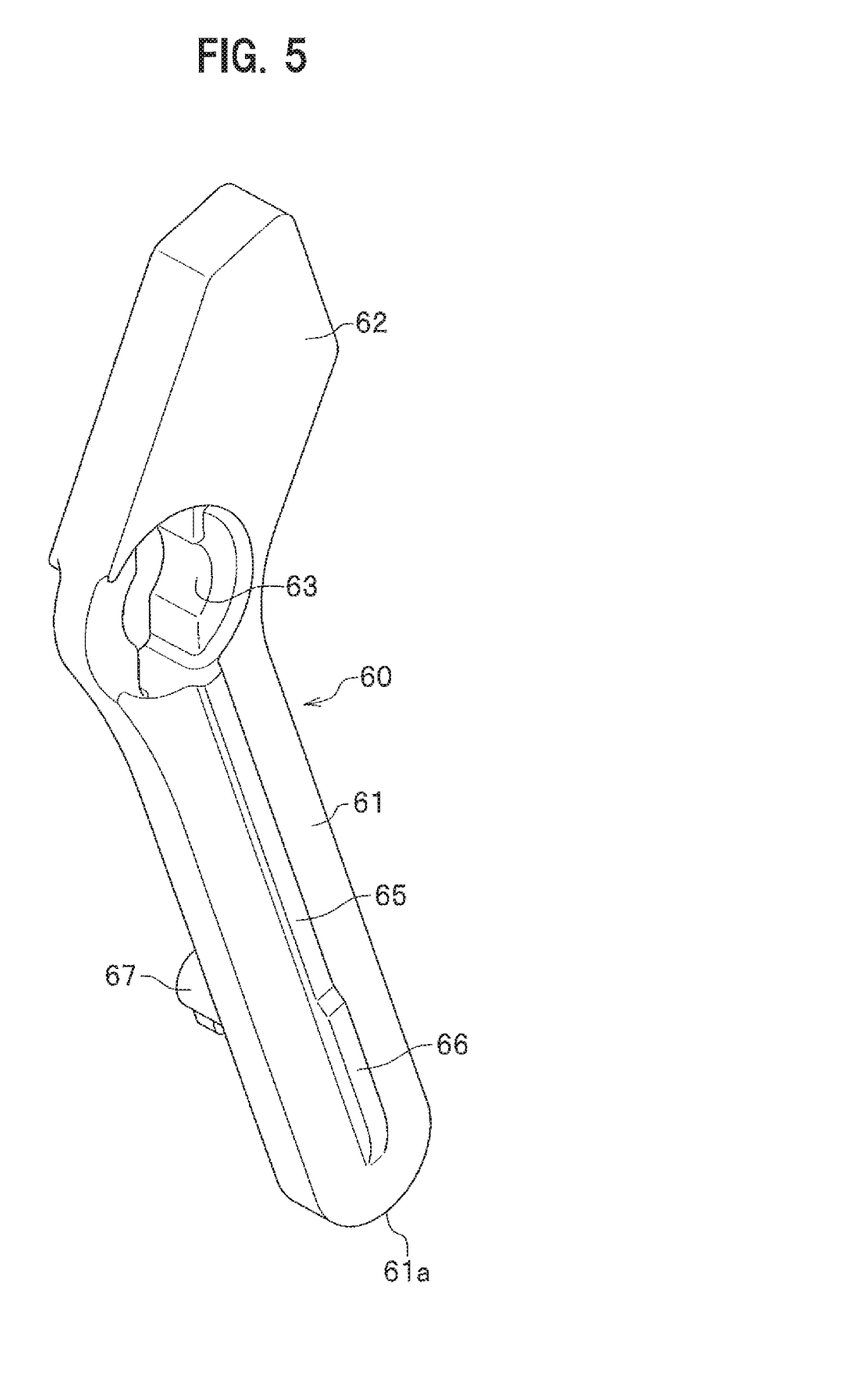
FIG. 5 is a perspective view of the lock member.

The lock main body 61 is formed on its side surface in the vehicle width direction with a rib 65 for enhancing the strength, as shown in FIG. 5. The rib 65 is formed on some portion thereof (at an end closer to the other end 61a, in the present embodiment) with a contact rib 66 which is more raised than other portions of the rib 65. The contact rib 66 is (slidably) in contact with a side frame (not shown) or is arranged to have a slight gap, to play a role of suppressing backlash in the vehicle width direction of the lock member 60. The lock main body 61 is formed, on its inner side in the vehicle width direction at a position closer to the other end 61*a*, with an engaging portion 67 to protrude from the inner side.

The through-hole 63 is formed in the lock main body 61 at one end thereof (a portion adjacent to the unlocking portion 62), to allow the lock pivot shaft 64 to be inserted therethrough. The through-hole 63 works as a mounting portion attached to the arm portion 42 via the lock pivot shaft 64.

The unlocking portion 62 is formed to continue from the lock main body 61, as shown in FIG. 2. The unlocking portion 62 is a portion that extends obliquely upward from the through-hole 63 rearward, in a locking state of the lock main body 61 locking the arm portion 42 being pivoted downward. The unlocking portion 62 is arranged to face the stopper portion 43 in the locking state. The unlocking portion 62 has its front end protruding above the upper surface of the arm portion 42 in the locking state. In the locking state, when the unlocking portion 62 is pressed forward by the pressing shoe 2*a*, the lock main body 61 has its front end being pivoted backward about the lock pivot shaft 64 to transition from the raised state to an inclined state, to unlock the locking state of the arm portion 42.

The guide member 70 is a member that guides the lock main body 61 so as to be pivoted forward to a position where the lock main body 61 is in contact with the fixed portion 10 and raised. The guide member 70 is composed of a tension spring arranged at a position anterior to the lock body 61. One end of the guide member 70 is engaged with the engaging portion 44 of the arm portion 42, while the other end is engaged with the engaging portion 67 (see FIG. 5) of the lock main body 61.

The deflector structure for a sunroof device according to the embodiment of the present invention is basically configured as described above. Next, its function will be described with reference to FIGS. 6A to 6C and 7. First, a description will be given of the function at a time of the roof panel 2 being opened.

Figure 6A:
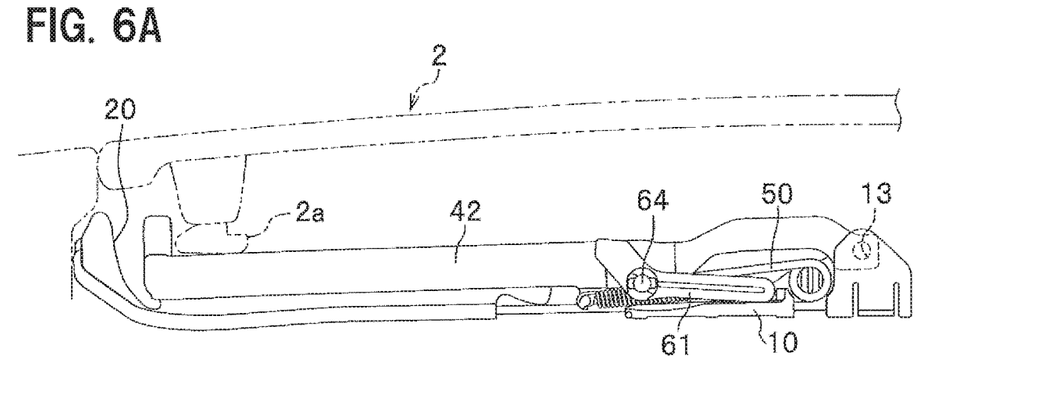
FIG. 6A is a side view of the deflector in a fully closed state, for demonstrating its function when a roof panel is to be opened.

When the roof panel 2 is closed as shown in FIG. 6A, the pressing shoe 2*a* provided on the lower surface of the roof panel 2 presses the arm portion 42 downward against a biasing force of the biasing member 50. In this state, the affected portion 20 is folded and stored under the roof. In addition, the lock main body 61 is in a collapsed state between the fixed portion 10 and the arm portion 42.

Figure 6B:
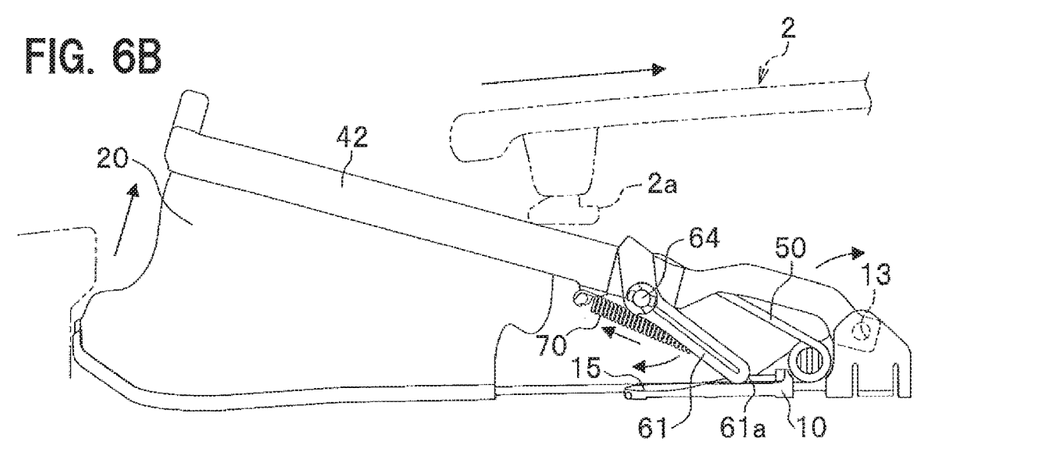
FIG. 6B is a side view of the deflector in an intermediate state, for demonstrating its function when the roof panel is being opened.

Subsequently, when the roof panel 2 slides rearward as shown in FIG. 6B, the pressing by the pressing shoe 2*a* against the arm portion 42 is gradually released, to allow the arm portion 42 to be pivoted upward about the pivoting support pin 13 due to the biasing force of the biasing member 50. The affected part 20 is pulled upward and rearward in conjunction with the arm portion 42 being pivoted upward, and the lock main body 61 is pivoted forward about the lock pivot shaft 64. At this time, the other end 61*a* of the lock main body 61 slidably contacts the contact surface 15 of the fixed part 10, and the lock main body 61 is guided to pivot forward by the biasing force of the guide member 70.

Figure 6C:
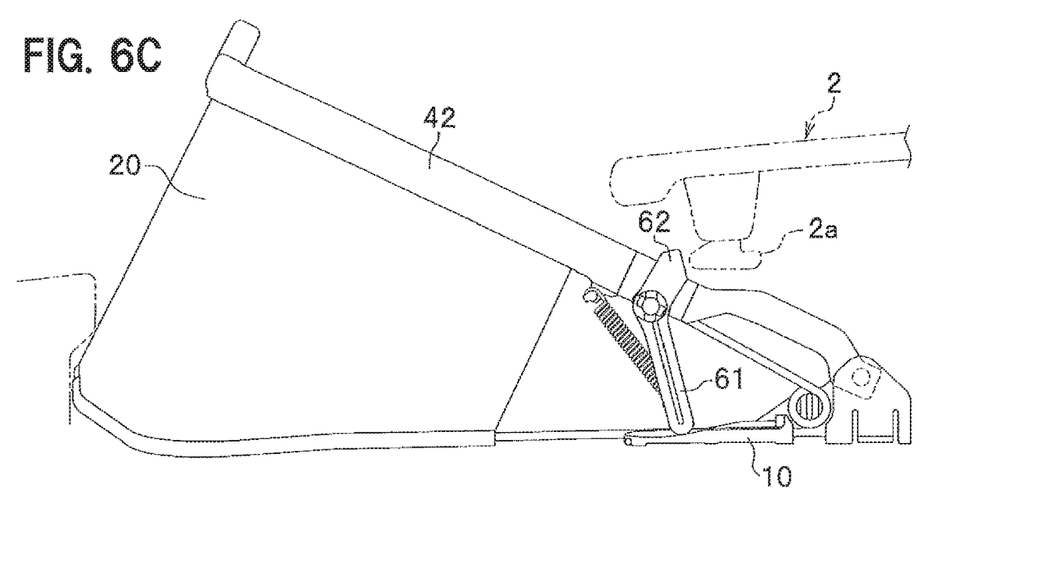
FIG. 6C is a side view of the deflector in a stretched state, for demonstrating its function when the roof panel is opened.

In a state of the roof panel 2 being completely open as shown in FIG. 6C, the pressure by the pressing shoe 2*a* against the arm portion 42 is completely released, and the affected part 20 is raised and stretched out in an inclined manner so that its upper end is posterior to its lower end. The lock main body 61 is in contact with the fixed portion 10 and raised substantially vertically between the fixed portion 10 and the arm portion 42. In other words, the lock main body 61 is raised so that the normal to the contact surface 15 substantially overlaps with the central axis of the lock main body 61. In this state, the lock main body 61 locks the arm portion 42 being pivoted downward. Note that the roof panel 2 is open and the pressing shoe 2*a* is therefore positioned posterior to the unlocking portion 62. Additionally, the amount of pivoting the arm portion 42 is configured to be determined from the length (height dimension) of the affected part 20.

Figure 7:
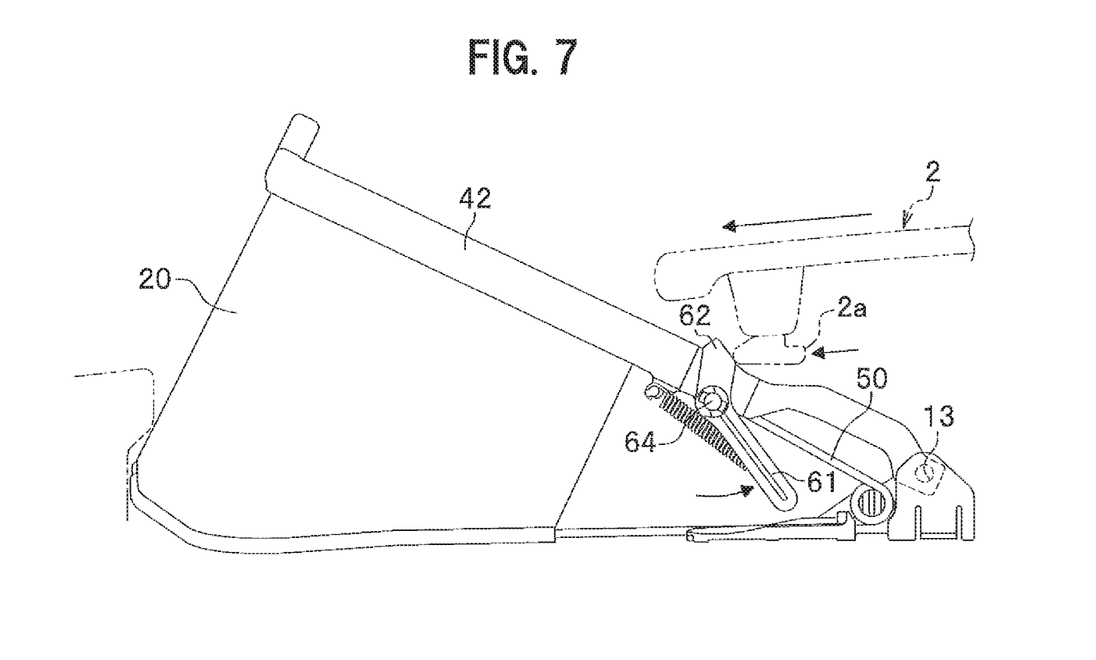
FIG. 7 is a side view of the deflector immediately after a locking state is unlocked, for demonstrating its function when the roof panel is to be closed.

Next, a description will be given of the function when the roof panel 2 is closed. When the roof panel 2 slides forward from the state shown in FIG. 6C, the pressing shoe 2*a* first presses the unlocking portion 62 forward as shown in FIG. 7. This causes the front end of the lock main body 61 to be pivoted rearward (upward) about the lock pivot shaft 64, transitioning from the raised state to the inclined state, to unlock the locking state of the arm portion 42.

Subsequently, when the roof panel 2 further slides forward to cause the pressing shoe 2*a* to run over the unlocking portion 62, the pressing shoe 2*a* pushes the arm portion 42 downward against the biasing force of the biasing member 50 (see FIG. 6B). At this time, the upper end of the affected part 20 is displaced downward and forward in conjunction with the arm portion 42 being pivoted downward, and the front end of the lock main body 61 is further pivoted rearward.

In a state of the roof panel 2 being completely closed as shown in FIG. 6A, the arm portion 42 is in a collapsed state. In this state, the affected part 20 is folded and stored under the roof. In addition, the lock main body 61 is in a collapsed state between the fixed portion 10 and the arm portion 42.

According to the present embodiment described above, the lock member 60 directly locks the arm portion 42 being pivoted downward, to inhibit the arm portion 42 from being pivoted when the vehicle traveling. Besides, according to the present embodiment, the lock mechanism is formed in a simple structure, to improve assembly productivity.

In addition, according to the present embodiment, when the unlocking portion 62 is pressed forward by the pressing shoe 2*a* in a state of the arm portion 42 being locked, the lock main body 61 is pivoted rearward, transitioning from the raised state to the inclined state, to unlock the locking state of the arm portion 42. This explains that the locking state is easily unlocked by the simple configuration of the lock member 60 additionally having the unlocking portion 62. Besides, the existing pressing shoe 2*a* for pushing the arm portion 42 downward is used in the present embodiment to press the unlocking portion 62, to mitigate a cost increase from having the lock member 60.

Further, according to the present embodiment, the guide member 70 is provided for guiding the lock main body 61 so as to be pivoted forward to a position where the lock main body 61 is in contact with the fixed portion 10 and raised, to allow the guide member 70 to guide the lock member 60 accurately and quickly to the position for the locking.

Furthermore, the lock main body 61 of the present embodiment has a curved surface on the other end 61*a* to have a convex downward shape in the raised state, while the fixed part 10 is formed to include the contact surface 15 having a curved surface in a concave downward shape, to be in contact with the other end 61*a* of the lock main body 61. The contact surface 15 can be flat, but having a curved surface allows the lock main body 61 to be smoothly pivoted. That is, the lock member 60 is capable of fulfilling the locking function even when the predetermined pivot position varies at the time of the lock member 60 being raised, due to the tolerance of the affected part 20, the arm portion 42, the lock member 60, and the like, to inhibit the arm portion 42 more reliably from being pivoted when the vehicle traveling.

A technique of increasing the biasing force of the biasing member 50 is conceivable as another means for inhibiting the arm portion 42 from being pivoted downward when the vehicle traveling. However, if the biasing force of the biasing member 50 is increased, the arm portion 42 would not be easily pivoted downward, but the sliding resistance between the arm portion 42 and the roof panel 2 would be increased to degrade the open/close performance of the roof panel 2. In this respect, in the present embodiment, the lock member 60 directly locks and unlocks the arm portion 42 being pivoted downward, to have no need of increasing the biasing force of the biasing member 50, and to inhibit the arm portion 42 from being pivoted downward when the vehicle traveling, while suitably securing the open/close performance of the roof panel 2.

Hereinabove, the embodiment of the present invention has been described, but the present invention is not limited thereto and can suitably be modified without departing from the scope of the invention. For example, the shape of the lock member 60 may be appropriately modified, as long as the arm portion 42 being pivoted downward is locked. In addition, the curvature radius of the curved surface of the contact surface 15 is preferably set as appropriate to such an extent that the lock member 60 is smoothly pivoted and is raised at a predetermined position, and that the tolerance of respective members is accepted. Note that the contact surface 15 may have a flat surface. The guide member 70 may be dispensed with, as long as the lock member 60 is suitably pivotable.

The invention claimed is:

1. A deflector structure for a sunroof device, comprising:
   a fixed part that is fixed to a side frame of a vehicle body;
   an affected part that is arranged anterior to the fixed part and is affected by onrushing air;
   an arm portion that has one end pivotally connected to a base of the fixed part and an other end holding the affected part, and is vertically pivoted about the fixed part;
   a biasing member configured to bias the arm portion upward; and
   a lock member that has one end pivotally connected to the arm portion and an other end of the lock member pivoted in conjunction with the arm portion being pivoted,
   wherein the lock member stays raised at a predetermined pivot position when a sunroof is opened via a second biasing member, with the other end of the lock member sliding on a support of the fixed part, to support the arm portion.

2. The deflector structure for a sunroof device according to claim 1,
   wherein the lock member has an unlocking portion that, when a pressing load is applied thereto in a locking state, unlocks the locking state.

3. The deflector structure for a sunroof device according to claim 1, further comprising:
   a guide member that has one end connected to the arm portion and an other end connected to the lock member,
   wherein the second biasing member guides the lock member so as to be pivoted to a position where the lock member is in contact with the fixed part and raised.

4. The deflector structure for a sunroof device according to claim 1,
   wherein the lock member has a curved surface on the other end thereof to have a convex downward shape in a raised state, while the support of the fixed part is formed to include a contact surface having a curved concave extending downward so as to contact the curved surface of the raised lock member.

* * * * *